3,333,190
FREQUENCY COMPARING SYSTEM USING AN
OSCILLOSCOPE DISPLAY
George F. Asbury and Earl J. Kohn, both c/o Naval Research Laboratory, Anacostia Station, Washington, D.C. 20390, and James R. Richards, 2813 63rd Ave., Cheverly, Md. 20785
Filed Feb. 9, 1951, Ser. No. 210,270
9 Claims. (Cl. 324—79)

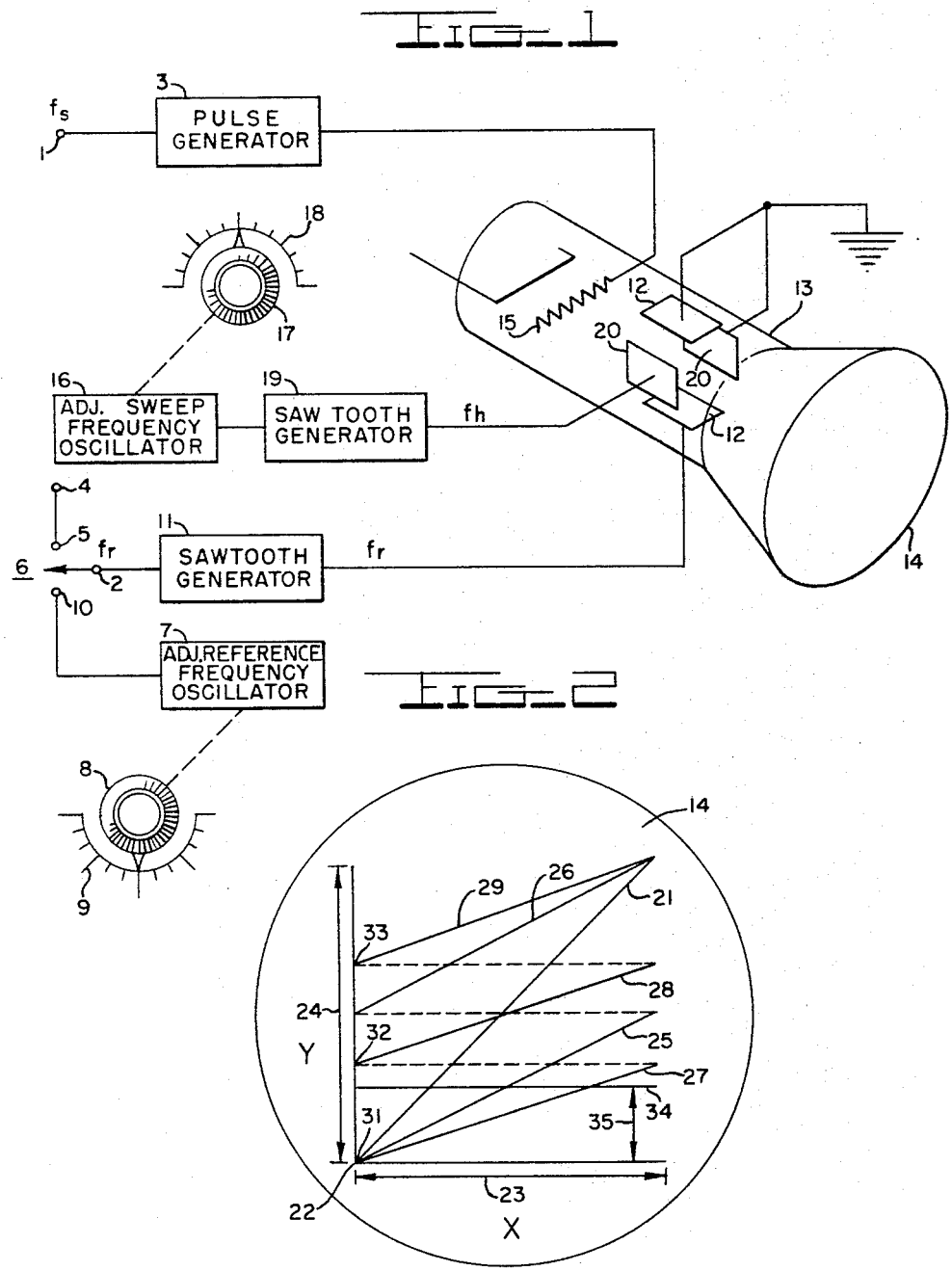

This invention relates to a system for comparing frequencies. More particularly it relates to a method of and means for determining with a high degree of accuracy an unknown frequency, or the difference between two frequencies, or for comparing two frequencies and determining their difference.

The invention has the advantage of providing a frequency comparison in the form of a visual indication which remains intelligible regardless of the difference between the frequencies being compared, and indicates their difference merely by its orientation, from which a direct determination of an unknown frequency may be obtained without the introduction of any conversion factors. Moreover, the system herein disclosed is operative to compare frequencies varying from a few cycles per second to high radio frequencies, whose difference frequency may vary over an equally wide range.

It is an object of this invention, therefore, to provide a method of comparing frequencies.

It is another object of the invention to provide a method and apparatus for determining with a high degree of accuracy one frequency relative to another frequency.

It is another object of this invention to provide a method and apparatus for producing a visual indication which enables a direct determination of an unknown frequency.

It is another object of the invention to provide a method and apparatus for obtaining a visual indication of the difference between two frequencies, which indication will remain intelligible as the difference varies.

It is another object to provide a system for measuring with great accuracy the difference between two frequencies which differ by a small amount, and for indicating a variation in such frequency difference with extreme sensitivity.

It is another object of the invention to provide a system for comparing two frequencies, which has greater flexibility and utility than frequency comparing systems known in the prior art.

Other objects and features of the present invention will appear more fully hereinafter from the following detailed description considered in connection with the accompanying drawings which disclose one embodiment of the invention. It is expressly understood, however, that the drawings are designed for purposes of illustration only, and not as a definition of the limits of the invention, reference for the latter purpose being had to the appended claims.

In the drawings, wherein like reference characters refer to like elements in all the figures:

FIG. 1 is a diagrammatic showing of a frequency comparing system constructed in accordance with the invention;

FIG. 2 depicts several typical visual indications which may be obtained on a cathode ray oscilloscope in the practice of the invention.

As stated heretofore, an object of the invention is to provide a method of comparing or relating frequencies. Briefly explained, the subject method involves the production of a visual indication of the phase difference between cycles of one of the frequencies being compared and respective cycles of the other frequency. If there is any difference between the two frequencies, the phase difference between respective cycles of the two frequencies will progressively change in magnitude. The subject method further provides for relating a plurality of respective phase difference indications in a composite indication, from which any such progressive change in magnitude may be observed, and the time rate of such change may be observed and measured. The time rate of change of the phase difference between respective cycles of the two frequencies is, of course, their frequency difference.

In the practice of this invention the frequencies to be compared are manifested as the recurrence frequencies of respective recurrent voltage signals, which frequencies may be designated arbitrarily as $f_s$ and $f_r$.

In the performance of the subject method, the recurrent voltage signals representing the frequencies to be compared are fed to a signal display device having provision for signal modulation in three coordinates. One convenient form of such a signal display device, for example, is the cathode ray tube, wherein an electron beam may be deflection-modulated in two coordinates, X and Y, across a luminescent screen, and intensity-modulated in a third, or Z, coordinate. One of the recurrent voltage signals is applied as the Z-coordinate modulation in the display device, and the other is applied as either the X- or or Y-coordinate modulation. The two signals may of course be employed interchangeably.

Application of one recurrent voltage signal to the Z-coordinate or intensity-modulation control of the display device causes a correspondingly recurrent variation in the intensity of the indication produced by the display device, analogous to a recurrent variation in the brightness of the indication produced by the electron beam on the luminescent screen of a cathode ray tube. Likewise the application of the other recurrent voltage signal to control the deflection-modulation in, for example, the Y-coordinate of the display device, produces a correspondingly recurrent variation in the position of the indication. With the two recurrent voltage signals so applied, the display device serves to indicate the phase relation between the Z-coordinate modulation and the Y-coordinate modulation.

If there is an harmonic frequency relation between $f_s$ and $f_r$, the recurrent Z-coordinate or intensity variation of the indication produced by the display device will be maintained in constant phase relation with its recurrent deflection, and as a result will appear to have no movement in the particular deflection coordinate. In the absence of such a frequency relation between $f_s$ and $f_r$, there will be a progressive change in the phase relation between successive cycles of the current intensity variation of the indication and respective cycles of the recurrent deflection of the indication, and the intensity variation will appear to move in the deflection coordinate. The rate of this movement provides a measure of the frequency difference. In the usual practice of the invention, unity harmonic ratio of the signals is employed, and the frequency relations are directly determined, as will be further described. The extension to other harmonic ratios is obvious.

The invention contemplates the measurement of this rate of movement of the intensity variation, by providing a simultaneous deflection-modulation of the indication produced by the display device in the other, or X, coordinate. This deflection-modulation is produced at a recurrence frequency of arbitrary known period, thus enabling the total change in phase relation between the intensity variation and the recurrent Y-coordinate deflection, during this arbitrary known period of time, to be indicated plainly by the display device. Thus the subject method of this invention makes possible a visual display of the time rate of change of the phase difference between respective cycles of two recurrent signals representing two frequencies. This time rate of change of phase difference, it will be recognized, is the frequency difference between the two frequencies. While both frequencies may be unknown, and the practice of the method above described enables a determination of their frequency difference, it should also be understood that either frequency may be a known reference frequency, in which case practice of the above described method enables a direct determination of the other frequency.

The waveform of each of the recurrent voltage signals discussed above need not be of any particular shape. It may be a sine curve, sawtooth, trapezoid, sharp pulse, or any other shape so long as the recurrence frequency of the waveform provides a measure of the frequency, either $f_s$ or $f_r$, which it is designed to manifest. As a practical matter, however, it is preferable to produce deflection-modulation which is linear with time. To this end the recurrent voltage signal utilized to produce the Y-coordinate deflection-modulation may be converted to a sawtooth or triangle or any such waveform varying linearly with time.

Also, it is desirable to produce recurrent intensity modulation of the indication produced by the display device which is easily discernible, so that its rate of change of phase relative to the recurrent deflection may easily be measured. While a recurrent waveform of any shape would produce recurrent intensity variations sufficiently discernible to form a sensible indication of this phase relation, for better results it is desirable to produce an intensity variation which is both abrupt and of short duration relative to the period of the Y-coordinate deflection frequency. To this end the recurrent voltage signal utilized to produce the Z-coordinate modulation may be converted to sharp pulses of short duty cycle. The frequency of these pulses may be equal to, or a multiple or submultiple of, the frequency of the recurrent voltage signal they represent. Each of the narrow voltage pulses thus produced causes a brief variation in the intensity of the indication produced by the display device, which marks clearly and accurately the phase relationship between the cycle of the recurrent voltage signal from which the pulse is generated and the respective cycle of the recurrent voltage signal producing the Y-coordinate deflection modulation.

One novel form of apparatus for practicing the above described method is shown in FIG. 1, and will now be described in detail. The two recurrent voltage waveforms, of frequency $f_s$ and $f_r$, may be applied interchangeably to input terminals 1 and 2. The signal applied to terminal 1, designated arbitrarily as that of unknown frequency $f_s$, provides the input for pulse generator 3. Pulse generator 3 can be of any conventional form, and as explained heretofore may produce pulses at a frequency equal to, or a multiple or submultiple of, $f_s$. Also these pulses may be of either positive or negative polarity. For convenience in the description to follow, pulse generator 3 will be assumed to produce one positive polarity pulse per cycle of its input signal, $f_s$. Should the signal $f_s$ consist of recurrent pulses sufficiently narrow to give the desired reading accuracy, the use of generator 3 would not be necessary.

The signal applied to terminal 2, designated in the drawings as having frequency $f_r$, may be derived from either of two sources. It may be a signal of unknown frequency, applied to terminal 4, and thence through contact 5 of switch 6 to terminal 2. If both $f_r$ and $f_s$ are unknown, neither frequency alone, but only their difference frequency, can be determined directly. When it is desired to determine directly an unknown frequency, manifested for example by the $f_s$ signal, a recurrent voltage signal of known frequency is provided at terminal 2, from a source in the form of oscillator 7. The frequency of output of oscillator 7 is adjustable by hand control 8 and may be read on calibrated dial 9. The output of oscillator 7 is applied through contact 10 of switch 6 to a sawtooth generator 11 as a substitute for the recurrent voltage signal applied to terminal 4, and in this case $f_r$ becomes a known reference frequency with which $f_s$ may be compared.

The signal applied to terminal 2 is fed to sawtooth generator 11, where its waveform is converted to a sawtooth. The sawtooth waveform output of generator 11, of frequency $f_r$, is supplied to vertical deflection plates 12 of the cathode ray indicator tube 13, where it produces a linear time base sweep or constant velocity deflection of the cathode ray tube electron beam across luminescent screen 14, in the vertical or Y-coordinate.

Each successive pulse signal from pulse generator 3 is presented to the intensity control grid 15 of a cathode ray tube 13, and produces a brief pulse-intensified epoch of the electron beam in the cathode ray tube 13. The position of the electron beam, at the time of a brief intensification, relative to its position at the beginning of the beam deflection cycle, is a measure of the phase difference in the deflection cycle between the point corresponding to the occurrence of the pulse signal and that corresponding to the beginning of the beam deflection. This position is indicated by the bright spot which marks the point of impact of the electron beam on the luminescent screen 14 of the cathode ray tube 13 at the time of the brief intensification. The distance of the bright spot from the beginning of the sweep, measured in the sweep coordinate, is termed its displacement.

The system also includes an oscillator 16 which produces a known frequency output signal. The frequency of this oscillator is adjustable by hand control 17, and may be read directly on calibrated dial 18. This frequency may be designated arbitrarily as $f_h$. The output of oscillator 16 is converted in sawtooth generator 19 to a sawtooth waveform. This waveform is supplied to horizontal deflection plates 20 of the cathode ray indicator tube 13 to produce a constant velocity deflection of the electron beam across screen 14, in the horizontal or X-coordinate. The amplitude of this deflection is of course proportional to the amplitude of the sawtooth voltage output of generator 16.

When there is no difference between frequency $f_s$ and frequency $f_r$, respective intensified epochs of the electron beam will brighten respective vertical sweeps at a position of constant displacement in the Y-coordinate. As explained above, the exact position of the bright spots in the Y-coordinate will depend on the difference of phase in each vertical deflection cycle between the beginning of the deflection and the occurrence of its respective intensifying pulse.

If there is a frequency difference, however, between $f_r$ and $f_s$, respective intensified epochs of the electron beam, being produced at a frequency corresponding to $f_s$ and bearing a constant phase relation with the respective cycles of the input signal at terminal 1, will occur in progressively varying phase relation with the beginning of respective sawtooth waveforms of frequency $f_r$. Hence the bright spots produced on the cathode ray tube display by the successive intensified epochs of the electron beam will occupy positions of progressively increasing or decreasing displacement in the Y-coordinate.

The time rate of change of this displacement of the successive bright spots, i.e., their displacement frequency, is equal to the time rate of change of the phase difference between the cycles of $f_s$ represented by the intensifying pulses, and the cycles of $f_r$, represented by the deflection cycles. This time rate of change of phase difference, it will be recognized, is the frequency difference between $f_s$ and $f_r$.

In order to indicate on the screen of the cathode ray tube the magnitude of this frequency difference the linear sweep or constant velocity deflection of the electron beam in the X-coordinate is provided.

When the electron beam is deflected in two coordinates, successive sweeps of the electron beam in one coordinate will then occupy positions which are progressively displaced in the other coordinate. In the operation of the apparatus thus far described, therefore, the intensified epochs of the successive sweeps in the first coordinate will be progressively displaced in the Y-coordinate, and, by the action of the X-coordinate deflection, progressively displaced in the X-coordinate. This results in the formation on luminescent screen 14 of a coherent brightened linear trace, composed of successive bright spots which are progressively displaced horizontally at a rate equal to the X-coordinate deflection frequency $f_h$, and progressively displaced vertically at a rate equal to the difference frequency between $f_s$ and $f_r$.

The orientation of this brightened trace provides an indication of the relation of the frequencies being investigated. When $f_h$ is equal to the difference between $f_r$ and $f_s$, for example, successive intensified epochs of the electron beam will be displaced just as rapidly in the X-coordinate as in the Y-coordinate, and, when the beam deflection amplitudes are equal, the resulting linear trace will be oriented at a 45 degree angle relative to the X-coordinate, as shown for example by line 21, in FIG. 2. The slope of this line, being the tangent of the angle it forms relative to the X-coordinate, is unity.

If the pulse generator 3 is amplitude responsive, that is generates a pulse at a selected point in the cycle of its input signal corresponding to a specific amplitude, variations in the amplitude of the signal input to pulse generator 3 may cause variations in the phase of each pulse generated relative to the cycle during which it is generated. This will in turn cause inaccuracies in the displacement of the individual bright spots produced by such pulses. In the composite display of the many bright spots which make up a coherent trace on luminescent screen 14, however, slight inaccuracies in the displacement of a few individual bright spots do not change the orientation of the coherent trace as a whole, and the accuracy of the display is unaffected. To avoid such inaccuracies completely a non-amplitude responsive type of pulse generator, such as for example a saturable reactor, may be used.

The point of origin 22 of the line 21 is shown in FIG. 2 as coincident with the lower end of the vertical sweep. It will be understood however, as explained above, that the displacement of the point of origin in the Y-coordinate may vary throughout the length of the vertical sweep, depending on the relative phase of $f_r$ and $f_s$ at the instant the X-coordinate deflection is begun.

When the X-coordinate deflection frequency is twice that of the displacement frequency of the intensified epochs in the Y-coordinate, successive intensified epochs will progress through the full amplitude of horizontal displacement 23 twice, while progressing once through the full amplitude of vertical displacement 24. With equal beam deflection amplitudes in both coordinates, this will form a pair of brightened lines 25 and 26, each of which has a slope of ½, or is oriented with respect to the X-coordinate at an angle whose tangent is ½. Likewise, if the frequency of displacement of the intensified epochs in the Y-coordinate is one-third the X-coordinate deflection frequency, three lines 27, 28 and 29 will be formed, having their points of origin 31, 32 and 33 respectively equally spaced along the Y-coordinate, and having a slope of ⅓. Thus the slope of the brightened trace equals the ratio of the displacement frequency of the intensified epochs in the Y-coordinate to the X-coordinate deflection frequency.

With this arrangement an unknown frequency $f_s$ may be determined directly, as follows: With $f_h$ set at some nominal frequency, for example 100 cycles per second, sawtooth generator 11 is connected to derive its input from oscillator 7, whose output frequency $f_r$ is thereby established as a reference frequency. This reference frequency $f_r$ is slowly varied by hand control 8 through the region of $f_s$, until a brightened trace having a slope of unity appears on the luminescent screen 14. As explained above, appearance of this trace indicates that the difference frequency between $f_r$ and $f_s$ is 100 cycles per second. If $f_s$ exceeds $f_r$ by 100 cycles, the trace will have a negative slope, i.e., will decrease in Y-coordinate displacement as it increases in X-coordinate displacement. If $f_s$ is 100 cycles less than $f_r$, the slope will be positive. Thus, knowing the direction and amount that $f_r$ differs from $f_s$ enables $f_r$ to be varied in the direction of $f_s$. Further adjustment of $f_r$ to bring the slope of the brightened trace to zero produces a horizontal line, such as line 34, which indicates that the time rate of displacement of the bright spots in the Y-coordinate is zero. Thus the horizontal orientation of the brightened trace indicates directly that the unknown frequency $f_s$ is equal to the known reference frequency $f_r$, and may be read directly from calibrated dial 9.

As explained above, the displacement 35 of line 34 in the Y-coordinate provides a measure of the phase difference between the input signal at terminal 1, and the input signal to sawtooth generator 11. Also the operation of the system is such that a phase variation in either of the signals being compared produces a corresponding irregularity in the linearity of the brightened trace.

When the horizontal deflection frequency $f_h$ is low, a great many vertical deflections taken place during the period of one horizontal deflection, and the brightened trace is composed of a very large number of adjacent brightened portions of successive vertical sweeps. Therefore even a very minute change in the unknown signal frequency $f_s$, and hence the frequency of the pulses generated therefrom, although producing only a very minute change in the vertical displacement of successive brightened portions from one vertical deflection to the next, will produce over the course of a large number of vertical deflections a cumulative vertical displacement which is easily discernible. The slower the horizontal deflection, the greater will this cumulative vertical displacement be. For example, when $f_h$ is decreased to one cycle per second, and $f_r$ is properly adjusted to give the brightened trace a slope of zero, it will be apparent that a change in $f_s$ of only one cycle per second away from $f_r$ will change the slope to unity, thus varying the orientation of the brightened trace through an angle of 45°. Therefore, by choosing a very low horizontal deflection frequency the sensitivity and accuracy with which any change in the frequency $f_s$ can be indicated is very great.

Since as explained above, the rate of displacement of the bright spots in the Y-coordinate is the frequency difference between $f_r$ and $f_s$, this frequency difference may be readily ascertained without ever measuring $f_r$ or $f_s$ directly, by the simple adjustment of oscillator 16 until, with equal deflection amplitudes in both X and Y coordinates, the brightened trace on the screen 14 has a slope of unity. At this point the known horizontal deflection frequency $f_h$ is equal to, and provides on dial 18 a direct measure of, the frequency difference between $f_r$ and $f_s$. Thus the magnitude of the frequency difference which can be measured is limited only by the range of oscillator 16. In this mode of operation as explained heretofore, one unknown frequency signal, $f_s$, is connected to input terminal 1, while the other is connected to terminal 2, through terminal 4 and the movable contact of switch 6 to serve as the $f_r$ signal input to sawtooth generator 11, replacing the signal generated by oscillator 7.

It should be further appreciated, moreover, that even when the frequency difference between $f_r$ and $f_s$ is very small, this difference may be ascertained with great accuracy by making $f_h$ equally small. For example, if $f_r-f_s=1$ cycle per second, reduction of $f_h$ to 1 cycle per second will give the brightened trace a slope of unity as shown at 21 in FIG. 2. With $f_h$ constant at 1 cycle per second, a subsequent reduction in $f_r-f_s$ of only one-half cycle per second will change the slope of the brightened trace from that of line 21 to that of lines 25 and 26, or from a slope of unity to a slope of ½. This is a substantial change in orientation of the trace and enables the difference frequency $f_r-f_s$ to be measured with extreme sensitivity.

Although only one form of novel apparatus for practicing the method of this invention has been disclosed and described herein, it is expressly understood that various changes and substitutions may be made therein without departing from the spirit of the invention as understood by those skilled in the art. For example a mechanical oscillograph or electro-mechanical recorder type of three coordinate display device such as that shown in Patent No. 2,202,855 may be substituted for the cathode ray indicator tube herein described. In such an arrangement the indicating medium, consisting of electrochemical recording paper, corresponds to the luminescent screen 14 of the cathode ray tube 13; the indicating element, consisting of an electrically conducting helical stylus, corresponds to the electron beam; and the voltage pulses for marking the recording paper correspond to the $f_s$ pulses herein described. Also the rotation frequency of the helical stylus and the feeding speed of the recording paper correspond to $f_r$ and $f_h$, respectively. Reference therefore should be had to the appended claims for a definition of the limits of the invention.

It may thus be seen that there has been shown and described a method of producing a visual indication of the frequency relation between two signals, in terms of the time rate of change of the phase difference between their respective cycles, and a method and apparatus for determining an unknown frequency or the difference between two frequencies.

The invention described herein may be manufactured and used by or for the Government of the United States of America for governmental purposes without the payment of any royalties thereon or therefor.

What is claimed is:

1. Apparatus for comparing the frequencies of a first and a second energy wave comprising a pulse generating means fed by said first energy wave for generating during a selected point in each cycle of said first energy wave a pulse signal of short duration relative to said cycle, a cathode ray indicator tube including means producing an electron beam and a luminescent screen receiving the beam, beam intensity modulating means responsive to said pulse signal to intensify said electron beam during said pulse signal to produce an indication on said screen, first deflection voltage generating means fed by said second energy wave for generating a first deflection voltage at said second energy wave frequency, first beam deflecting means responsive to said first deflection voltage to deflect said beam in a first coordinate on said screen with a constant velocity at said second wave frequency, an adjustable constant frequency oscillator, second beam deflecting means fed by the output of said oscillator to deflect said beam in a second coordinate on said screen with a constant velocity at said adjustable frequency to space said indications equally in said second coordinate, means for adjusting said adjustable frequency to form from successive indications a single coherent trace on said screen, and means indicating the magnitude of said adjustable frequency.

2. A system for comparing a first frequency and a second frequency comprising a first sawtooth generator means for generating a first sawtooth waveform having a frequency equal to said first frequency; pulse forming means for generating a succession of narrow pulses at a frequency equal to said second frequency; a cathode ray indicator tube including an electron beam and a luminescent screen; intensity control means for said beam operative responsive to said narrow pulses to produce on said screen a succession of intensified epochs of said beam at said second frequency; first beam deflecting means operative responsive to said first sawtooth waveform to deflect said beam with constant velocity in a first coordinate at said first frequency, whereby the displacement of said successive intensified epochs of said beam in said first coordinate varies at the difference frequency between said first and said second frequencies; adjustable frequency sawtooth generator means for generating a second sawtooth waveform; second beam deflecting means operative responsive to said second sawtooth waveform to deflect said beam with constant velocity in a second coordinate, whereby said successive intensified epochs of said beam are displaced in said second coordinate at said adjustable frequency; means for adjusting said adjustable frequency to form from said successive intensified epochs at least one brightened trace on said luminescent screen having a slope proportional to the ratio of the time rate of change of said phase difference and the rate of said second coordinate displacement, and means for indicating said adjustable frequency.

3. Method of determining an unknown signal frequency comprising generating a known reference frequency signal, producing a linear graphical indication in two coordinates of the variation with respect to time of the relative phase of cycles of the unknown frequency signal and respective cycles of the reference frequency signal, and varying said reference signal frequency to adjust the slope of said linear graphical indication to indicate zero time variation of said relative phase whereby said known frequency equals said unknown frequency.

4. Method of determining an unknown signal frequency comprising generating a known reference frequency signal, producing a linear graphical indication in two coordinates of the variation with respect to time of the relative phase of successive cycles of the unknown frequency signal and successive respective cycles of the reference frequency signal, and varying said reference signal frequency to adjust the slope of said linear graphical indication to indicate zero time variation of said relative phase whereby said known frequency equals said unknown frequency.

5. Apparatus for determining the frequency of an energy wave by indicating the time rate of change of the phase difference between the energy wave and a reference frequency wave signal comprising a reference frequency wave signal source, indicating means including an indicating medium and an indicating element therefor operative responsive to each cycle of said energy wave to produce an indication on said medium for an interval short relative to the period of said energy wave, first indicating element deflecting means responsive to said reference frequency wave signal to move said indicating element in one coordinate of said medium at said reference frequency, second indicating element displacing means for moving the indicating element simultaneously in a second coordinate of said medium at a constant velocity to space said indications equally in said second coordinate, and means for adjusting said reference frequency to position said indications in a predetermined orientation relative to said second coordinate.

6. Apparatus for determining the frequency of an energy wave by indicating the time rate of change of the phase difference between the energy wave and a reference frequency signal comprising a cathode ray indicator tube including means producing an electron beam and a luminescent screen receiving the beam, beam intensity modulating means fed by the energy wave for varying the beam intensity to produce an indication on said luminescent screen during each cycle of said wave, electron beam deflecting means for deflecting the beam in two coordinates on said screen, and means for adjusting the frequency of the beam deflection in one coordinate to equal said reference frequency.

7. An apparatus for measuring the frequency of an energy wave comprising a cathode ray indicator tube including means producing an electron beam and a luminescent screen receiving the beam, intensity modulating means fed by the energy wave for varying the beam intensity to produce an indication on said luminescent screen during each cycle of said wave, electron beam deflecting means for deflecting the beam in two coordinates on said screen, means for varying the frequency of the beam deflection in one coordinate to position said indications in a linear trace having a predetermined orientation relative to said other coordinate, and means indicating said one coordinate deflection frequency.

8. Apparatus for determining an unknown signal frequency comprising a reference frequency signal source; phase comparing means for determining the phase difference between each cycle of said unknown frequency signal and each respective cycle of said reference frequency signal; said phase comparing means including a cathode ray indicator tube having an electron beam pulse-modulated in intensity at the unknown frequency for an interval short relative to the period of said unknown frequency signal and deflected in one coordinate at the reference frequency; phase difference comparing means deflecting said electron beam in another coordinate at an adjustable frequency for producing a composite indication of a plurality of successive values of said phase difference to indicate the time rate of change of said phase difference; control means for adjusting said adjustable frequency to vary the number of said successive values composing said indication; means varying said reference frequency to indicate zero time rate of change of said phase difference, and means indicating the magnitude of said reference frequency.

9. Means for determining an unknown signal frequency comprising a source of reference frequency signals, means fed by said unknown frequency signal for generating a control signal coincident with a selected point in each cycle of said unknown frequency signal, indicating means including a cathode ray tube having a luminescent screen and a moveable electron beam therefor operative responsive to said control signal to produce a bright spot on said luminescent screen, first electron beam displacing means for moving said electron beam in a first coordinate from a reference position at the reference frequency so that the electron beam is energized during each cycle of the reference frequency signal to produce a bright spot on said luminescent screen having a first coordinate displacement relative to the reference position equal to the phase difference between the cycle of said reference frequency signal and said selected point in the respective cycle of said unknown frequency signal, second electron beam displacing means for moving the electron beam in a second coordinate at a constant velocity to space each of said bright spots equally in said second coordinate, whereby said bright spots define a linear trace having a slope proportional to said time rate of change of said phase difference, means for adjusting said reference frequency to reduce said slope to zero, and means for indicating the magnitude of said reference frequency.

References Cited

UNITED STATES PATENTS

| | | | |
|---|---|---|---|
| 2,130,134 | 9/1938 | Iams | 315—25 |
| 2,173,184 | 9/1939 | Seely | 324—121 |
| 2,246,918 | 6/1941 | Iams | 315—27 |
| 2,280,531 | 4/1942 | Norgaard | 324—121 |
| 2,283,616 | 5/1942 | Slonczewski et al. | |
| 2,285,038 | 6/1942 | Loughlin | 324—88 |
| 2,321,581 | 6/1943 | Conover | 324—88 X |
| 2,324,915 | 7/1943 | Dow. | |
| 2,378,612 | 6/1945 | Woerner | 315—22 X |
| 2,422,386 | 6/1947 | Anderson | 250—39 |
| 2,426,721 | 9/1947 | Adams. | |
| 2,428,424 | 10/1947 | Landon | 324—88 X |
| 2,436,827 | 3/1948 | Richardson | 250—39 |
| 2,448,762 | 9/1948 | Beste | 315—22 X |
| 2,537,104 | 1/1951 | Taylor | 324—79 |
| 3,002,089 | 9/1961 | Labin. | |
| 3,078,415 | 2/1963 | Frelich | 324—88 |

RUDOLPH V. ROLINEC, *Primary Examiner.*

DAVID J. GALVIN, JAMES L. BREWRINK, ARTHUR GAUSS, CHESTER L. JUSTUS, WALTER L. CARLSON, *Examiners.*

T. D. JENNINGS, M. R. WILBUR, P. F. WILLE,
*Assistant Examiners.*